United States Patent
Kyung et al.

(10) Patent No.: US 11,825,498 B2
(45) Date of Patent: Nov. 21, 2023

(54) ENHANCED RELIABILITY FOR DOWNLINK CONTROL INFORMATION (DCI) RECEPTION FROM MULTIPLE TRANSMIT RECEIVE POINTS (M-TRP)

(71) Applicant: MediaTek Singapore Pte. Ltd., Singapore (SG)

(72) Inventors: Gyu Bum Kyung, San Jose, CA (US); Chien-Yi Wang, Hsinchu (TW); Lung-Sheng Tsai, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 108 days.

(21) Appl. No.: 17/355,143

(22) Filed: Jun. 22, 2021

(65) Prior Publication Data

US 2022/0007371 A1 Jan. 6, 2022

Related U.S. Application Data

(60) Provisional application No. 63/057,914, filed on Jul. 29, 2020, provisional application No. 63/048,364, filed on Jul. 6, 2020, provisional application No. 63/047,331, filed on Jul. 2, 2020.

(51) Int. Cl.
*H04W 72/53* (2023.01)
*H04W 80/02* (2009.01)
(Continued)

(52) U.S. Cl.
CPC ........... *H04W 72/53* (2023.01); *H04W 24/08* (2013.01); *H04W 72/0446* (2013.01);
(Continued)

(58) Field of Classification Search
CPC . H04W 72/53; H04W 24/08; H04W 72/0446; H04W 72/0453; H04W 72/23;
(Continued)

(56) References Cited

U.S. PATENT DOCUMENTS

2021/0195601 A1* 6/2021 Khoshnevisan ........ H04W 8/24
2021/0314927 A1* 10/2021 Noh ...................... H04W 72/23
(Continued)

FOREIGN PATENT DOCUMENTS

| WO | 2020064512 A1 | 4/2020 |
| WO | 2020098731 A1 | 5/2020 |
| WO | 2020098737 A1 | 5/2020 |

OTHER PUBLICATIONS

3GPP TSG RAN WG1 Ad Hoc Meeting; R1-1800824, Vancouver, Canada, Jan. 22-26, 2018; Source: Huawei, HiSilicon; Title :Solution and TP for multi-TRP PDCCH transmission; (Year: 2018).*
(Continued)

*Primary Examiner* — Mohammed S Chowdhury
(74) *Attorney, Agent, or Firm* — Tong J. Lee

(57) ABSTRACT

A user equipment (UE) in wireless communication receives a configuration of search space (SS) sets that include a first SS set in a first control resource set (CORESET) and a second SS set in a second CORESET. The first CORESET and the second CORESET have different transmission configuration indication (TCI) states. The UE repeatedly receives downlink control information (DCI) via a first physical downlink control channel (PDCCH) and a second PDCCH. The first PDCCH is allocated with a first set of time-and-frequency resources configured for first SS set and the second PDCCH is allocated with a second set of time-and-frequency resources configured for the second SS set. The UE then parses the DCI to obtain control information for the wireless communication. Alternatively, the configuration of SS sets received by the UE is in one CORESET that has at least a TCI state and a second TCI state activated.

18 Claims, 15 Drawing Sheets

(51) Int. Cl.
*H04W 72/0446* (2023.01)
*H04W 72/0453* (2023.01)
*H04W 24/08* (2009.01)
*H04W 72/23* (2023.01)

(52) U.S. Cl.
CPC ....... *H04W 72/0453* (2013.01); *H04W 72/23* (2023.01); *H04W 80/02* (2013.01)

(58) Field of Classification Search
CPC ..... H04W 80/02; H04W 16/28; H04W 72/02; H04W 72/046; H04W 72/21; H04W 72/20; H04L 5/0035; H04L 5/0092; H04L 5/0053; H04B 7/0695
See application file for complete search history.

(56) References Cited

U.S. PATENT DOCUMENTS

| | | | | |
|---|---|---|---|---|
| 2021/0321429 | A1* | 10/2021 | Sakhnini | H04W 72/23 |
| 2021/0345342 | A1* | 11/2021 | Sakhnini | H04W 72/23 |
| 2021/0377951 | A1* | 12/2021 | Khoshnevisan | H04W 72/23 |
| 2022/0070909 | A1* | 3/2022 | Takeda | H04W 72/23 |
| 2022/0124768 | A1* | 4/2022 | Frenne | H04L 1/1819 |
| 2022/0132474 | A1* | 4/2022 | Sasaki | H04L 5/0094 |
| 2022/0278787 | A1* | 9/2022 | Liu | H04W 72/51 |

OTHER PUBLICATIONS

3GPP TSG RAN WG1 Meeting #92; R1-1802576, Athens, Greece, Feb. 26-Mar. 2, 2018; Source: InterDigital, Inc.; Title: On PDCCH transmission with high reliability; (Year: 2018).*

3GPP TSG RAN WG1 Meeting #94bis; R1-1811401, Chengdu, China, Oct. 8-12, 2018; Source: Xiaomi; Title: Discussion on the PDCCH repetition for NR URLLC (Year: 2018).*

3GPP TSG RAN WG1 #101-e Tdoc R1-2004360, e-Meeting, May 25-Jun. 5, 2020; Source: Ericsson; Title: UE power saving using search space set switching; (Year: 2020).*

International Search Report for counterpart application PCT/CN2019/108826 issued by ISA/CN dated Dec. 20, 2019.

* cited by examiner

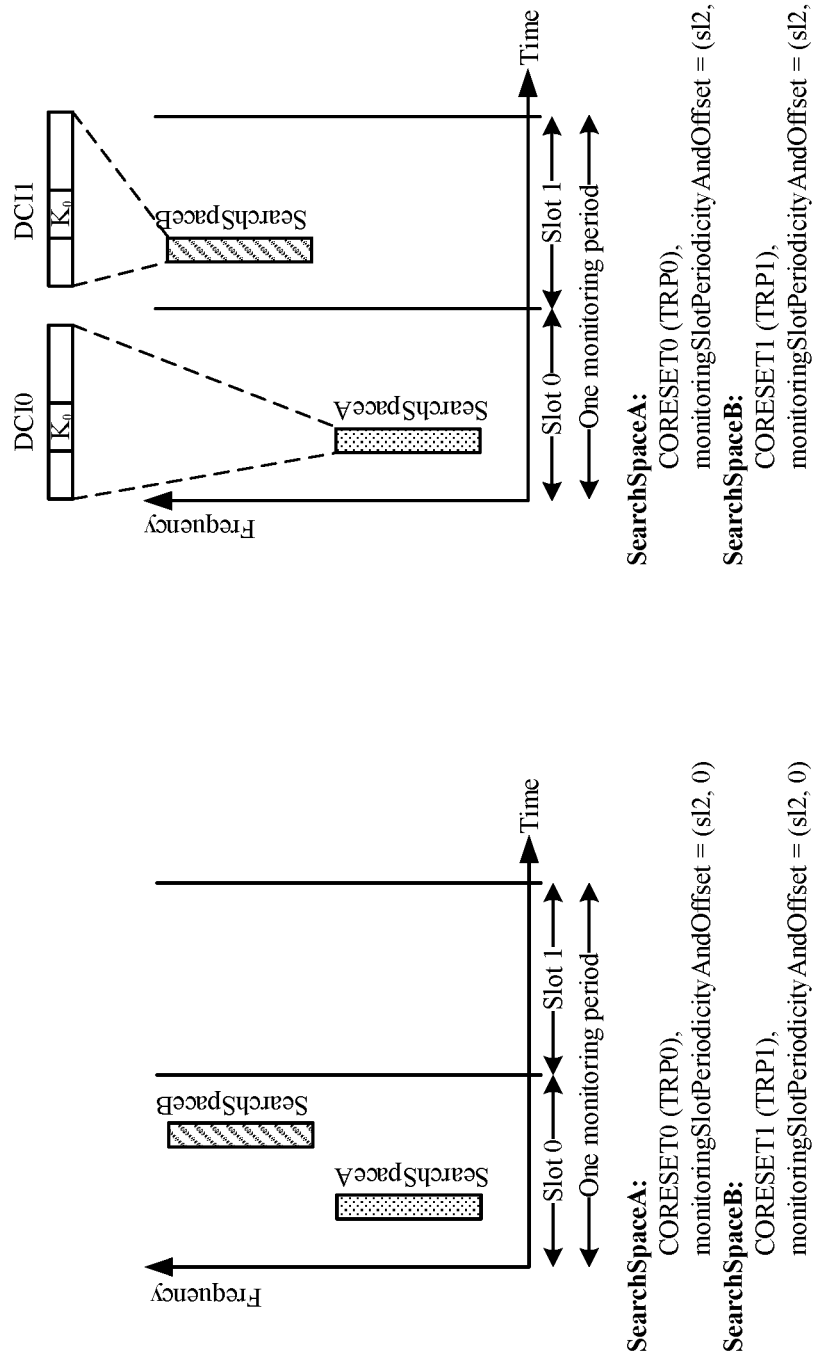

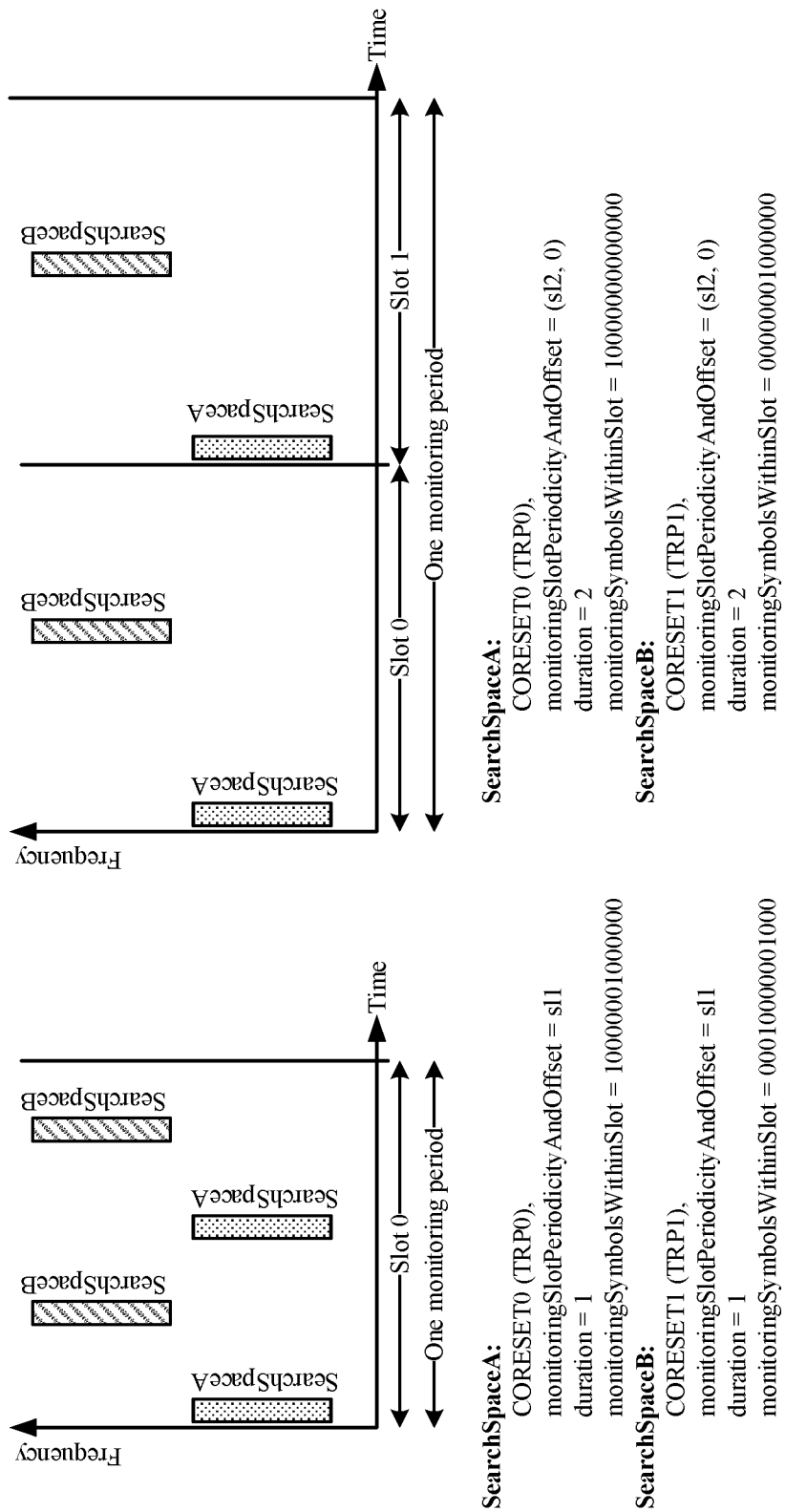

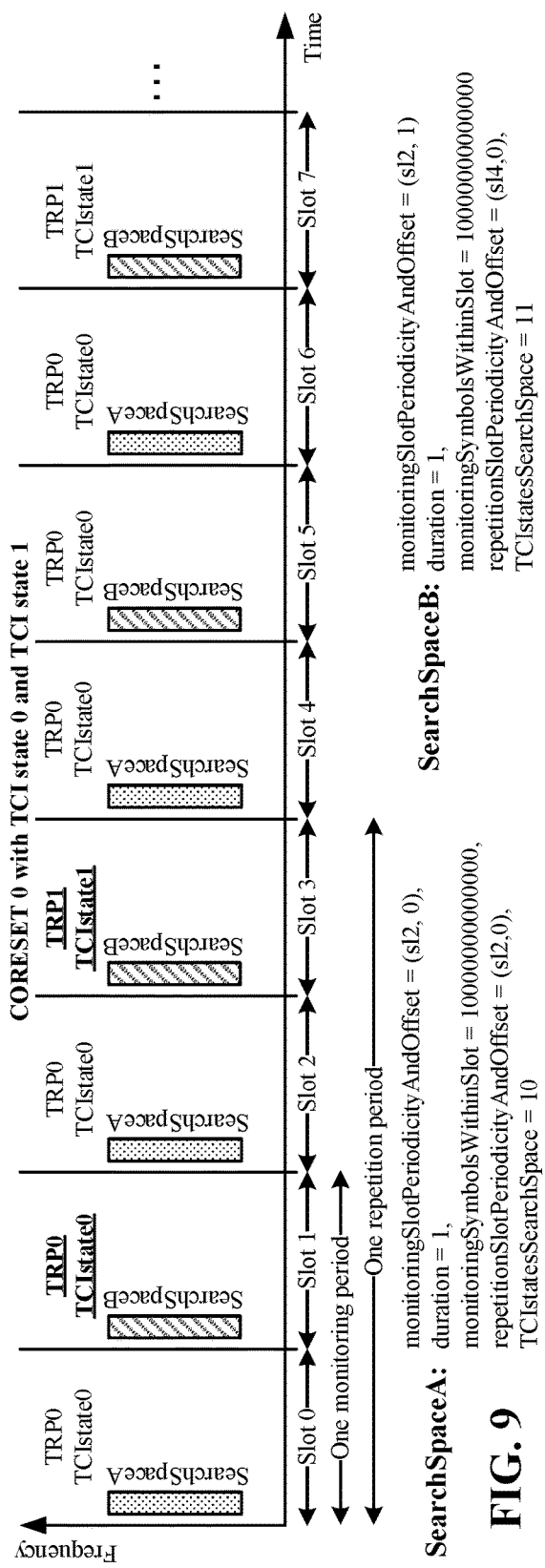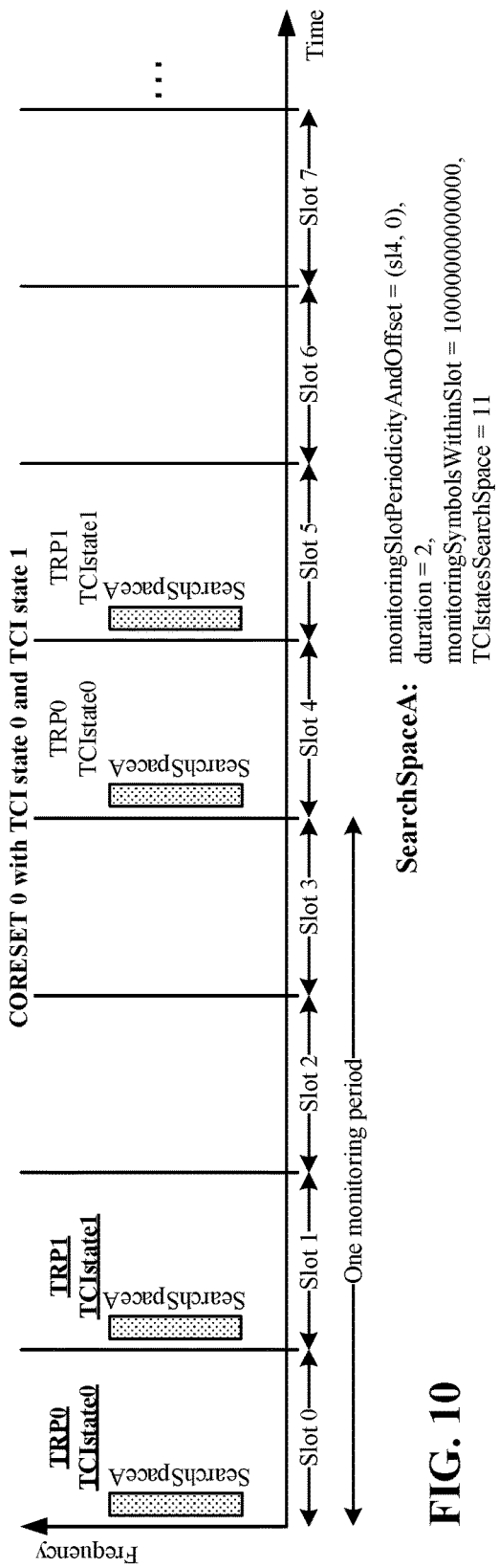

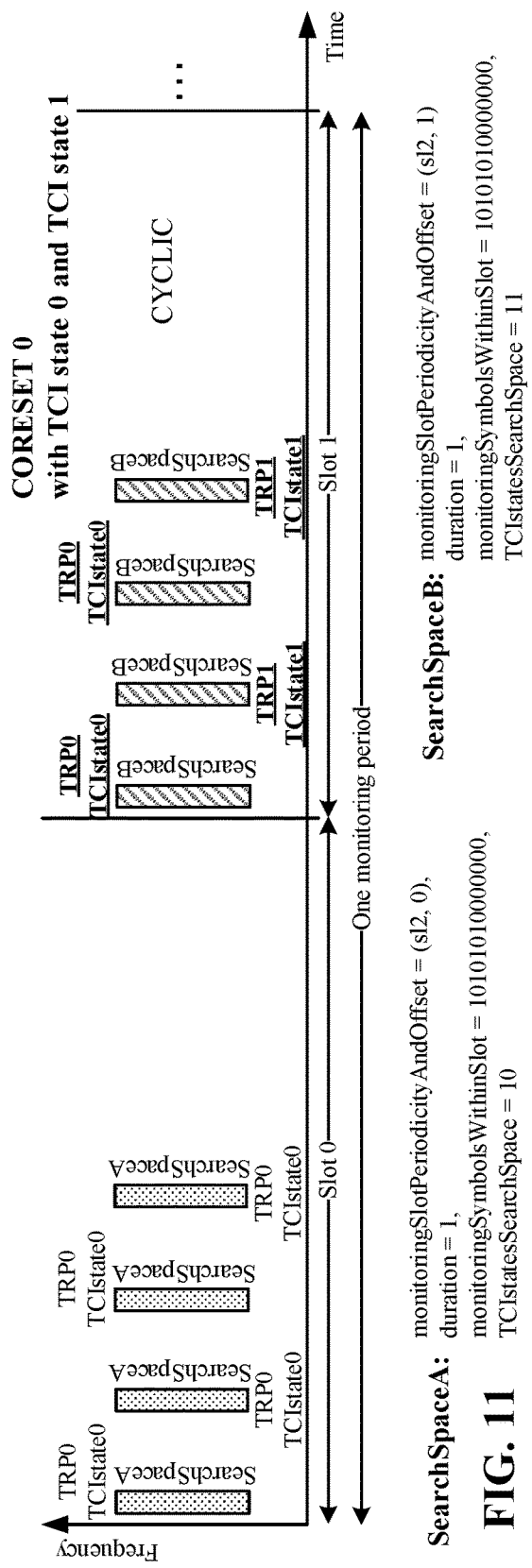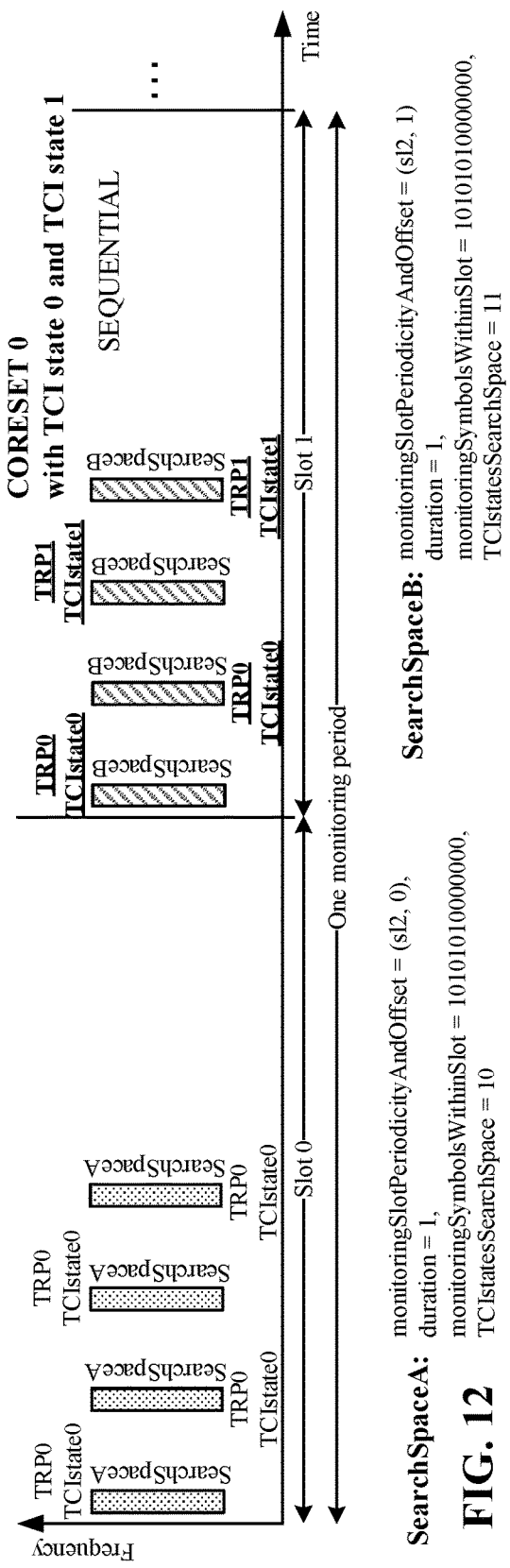

ENHANCED RELIABILITY FOR DOWNLINK CONTROL INFORMATION (DCI) RECEPTION FROM MULTIPLE TRANSMIT RECEIVE POINTS (M-TRP)

CROSS-REFERENCE TO RELATED APPLICATIONS

This application claims the benefit of U.S. Provisional Application No. 63/047,331 filed Jul. 2, 2020, U.S. Provisional Application No. 63/048,364 filed Jul. 6, 2020, and U.S. Provisional Application No. 63/057,914 filed Jul. 29, 2020, the entirety of all of which is incorporated by reference herein.

TECHNICAL FIELD

Embodiments of the invention relate to wireless communications; more specifically, to the configuration of a UE for receiving downlink control information (DCI) from multiple transmit receive points (M-TRP).

BACKGROUND

The Fifth Generation New Radio (5G NR) is a telecommunication standard for mobile broadband communications. NR is promulgated by the 3rd Generation Partnership Project (3GPP) to significantly improve performance metrics such as latency, reliability, throughput, etc. Furthermore, NR supports beamforming, multiple-input multiple-output (MIMO) antenna technology, and carrier aggregation.

In a 5G NR network, the UE can communicate to multiple TRPs at the same time, where the TRPs may be physically separated in different locations. A UE located near the cell edge may suffer from a high degree of path loss from the serving TRP and strong interference from neighboring TRPs. Joint or coordinated transmission among TRPs can increase spectral efficiency and reliability, especially for blocked channels.

The existing 5G NR technology can be further improved to benefit operators and users. These improvements may also apply to other multi-access technologies and the telecommunication standards that employ these technologies.

SUMMARY

In one embodiment, a method of wireless communication is performed by a user equipment (UE). The method comprises receiving a configuration of search space (SS) sets that include a first SS set in a first control resource set (CORESET) and a second SS set in a second CORESET. The first CORESET and the second CORESET have different transmission configuration indication (TCI) states. The method further comprises repeatedly receiving downlink control information (DCI) via a first physical downlink control channel (PDCCH) and a second PDCCH. The first PDCCH is allocated with a first set of time-and-frequency resources configured for first SS set and the second PDCCH is allocated with a second set of time-and-frequency resources configured for the second SS set. The method further comprises parsing the DCI to obtain control information for the wireless communication.

In another embodiment, a method of wireless communication is performed by a UE. The method comprises receiving a configuration of SS sets in a CORESET that has at least a first TCI state and a second TCI state activated. The method further comprises repeatedly receiving DCI via a first PDCCH and a second PDCCH. The first PDCCH is decoded based on the first TCI state and the second PDCCH is decoded based on the second TCI state. Furthermore, the first PDCCH and the second PDCCH are allocated with time-and-frequency resources configured for one or more of the SS sets. The method further comprises parsing the DCI to obtain control information for the wireless communication.

In yet another embodiment, a method of wireless communication is performed by a UE. The method comprises receiving a configuration of SS) sets in a CORESET that has TCI states activated. The CORESET includes resource units in frequency, time, or a combination of frequency and time. The method further comprises receiving DCI using the resource units that are associated with at least two of the TCI states activated in the CORESET. The method further comprises parsing the DCI to obtain control information for the wireless communication.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 3 illustrates an example of intra-slot repetitions with two CORESETs according to one embodiment.

FIG. 4 illustrates an example of inter-slot repetitions with two CORESETs according to one embodiment.

FIG. 5 illustrates an example of intra-slot repetitions with two CORESETs according to one embodiment.

FIG. 6 illustrates an example of intra-and-inter-slot repetitions with two CORESETs according to another embodiment.

FIG. 9 illustrates an example of inter-slot repetitions with one CORESET according to one embodiment.

FIG. 10 illustrates an example of inter-slot repetitions with one CORESET according to one embodiment.

FIG. 11 illustrates an example of intra-slot repetitions with one CORESET according to one embodiment.

FIG. 12 illustrates an example of intra-slot repetitions with one CORESET according to one embodiment.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention improve the reliability of downlink control information (DCI) transmission from multiple transmit receive points (M-TRP). The DCI can be repeatedly transmitted from multiple TRPs to achieve ultra-reliable low-latency communication (URLLC). Each of these TRPs corresponds to a distinct beam direction, and, therefore, a distinct transmission configuration indication (TCI) state. A UE may receive the DCI via multiple physical downlink control channels (PDCCHs) in corresponding control resource sets (CORESETs) over multiple PDCCH monitoring occasions. Alternatively or additionally, a UE may receive the DCI via one or more PDCCHs in one CORESET over multiple PDCCH monitoring occasions. When only one CORESET is used for DCI repetition (also referred to as PDCCH repetition), the one or more PDCCHs in the CORESET are configured with multiple different TCI states. As such, the UE can receive repeated DCI transmissions from M-TRP associated with multiple different TCI states to increase reliability in the wireless communication.

The disclosed method, as well as the apparatus and the computer product implementing the method, can be applied to wireless communication between a base station (e.g., a gNB in a 5G NR network) and UEs. It is noted that while the embodiments may be described herein using terminology commonly associated with 5G or NR wireless technologies, the present disclosure can be applied to other multi-access technologies and the telecommunication standards that employ these technologies. In the following, the term "multiple" is equivalent to "two or more." The terms "base station", "BS", "gNB", "node B", "access point (AP)", and "eNB" are used interchangeably. A single base station may include multiple TRPs, and different TRPs may be included in the same or different base stations.

Moreover, the TCI state described herein indicates quasi co-location (QCL) information for PDCCH reception. More specifically, the TCI state described herein indicates QCL-TypeD information, which provides receiver beam information on the UE side. If the demodulation reference signal (DMRS) of the PDCCH is quasi co-located with a reference signal with QCL-TypeD, this means that the UE may use the same spatial reception parameters used for receiving the reference signal in analog beamforming to receive the PDCCH.

Figure 1:
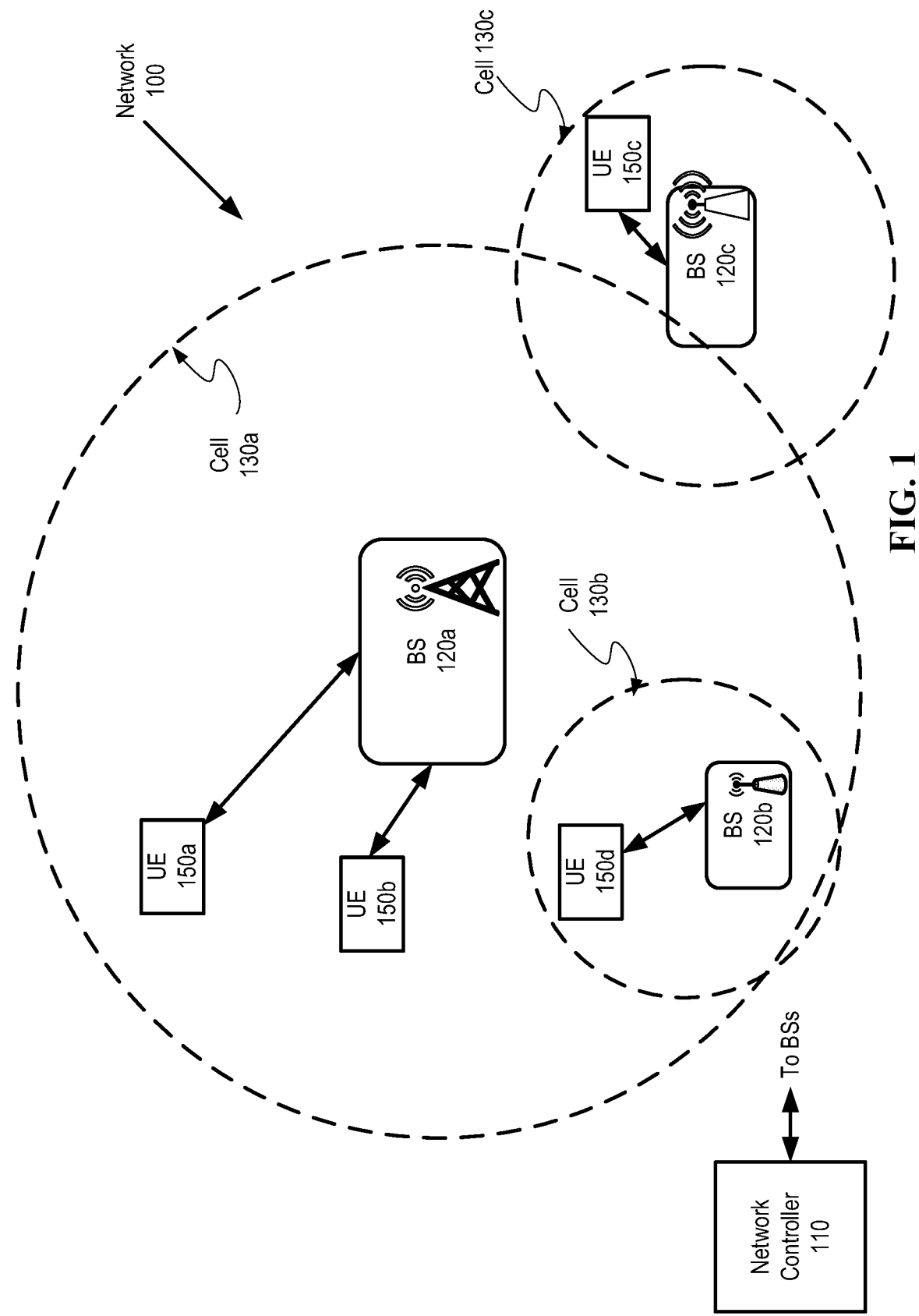
FIG. 1 is a diagram illustrating a network in which a base station and a UE communicate according to one embodiment.

FIG. 1 is a diagram illustrating a network 100 in which embodiments of the present invention may be practiced. The network 100 is a wireless network which may be a 5G NR network. To simplify die discussion, the methods and apparatuses are described within the context of a 5G NR network. However, one of ordinary skill in the art would understand that the methods and apparatuses described herein may be applicable to a variety of other multi-access technologies and the telecommunication standards that employ these technologies.

The number and arrangement of components shown in FIG. 1 are provided as an example. In practice, the network 100 may include additional devices, fewer devices, different devices, or differently arranged devices than those shown in FIG. 1.

Referring to FIG. 1, the network 100 may include a number of base stations (shown as BSs), such as base stations 120a, 120b, and 120c, collectively referred to as the base stations 120. In some network environments such as a 5G NR network, a base station may be known as a gNodeB, a gNB, and/or the like. In an alternative network environment, a base station may be known by other names. Each base station 120 provides communication coverage for a particular geographic area known as a cell, such as a cell 130a, 130b, or 130c, collectively referred to as cells 130. The radius of a cell size may range from several kilometers to a few meters. A base station may communicate with one or more other base stations or network entities directly or indirectly via a wireless or wireline backhaul.

A network controller 110 may be coupled to a set of base stations such as the base stations 120 to coordinate, configure, and control these base stations 120. The network controller 110 may communicate with the base stations 120 via a backhaul.

The network 100 further includes a number of UEs, such as UEs 150a, 150b, 150c, and 150d, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In one embodiment, the UEs 150 may communicate with their respective base stations 120 in their respective cells 130. A UE may have more than one serving cell; e.g., UE 150d may have both cell 130b and cell 130a as its serving cells. The transmission from a UE to a base station is called uplink transmission, and from a base station to a UE is called downlink transmission.

In one embodiment, each of the UEs 150 provides layer 3 functionalities through a radio resource control (RRC) layer, which is associated with the transfer of system information, connection control, and measurement configurations. Each of the UEs 150 further provides layer 2 functionalities through a packet data convergence protocol (PDCP) layer, a radio link control (RLC) layer, and a medium access control (MAC) layer. The PDCP layer is associated with header compression/decompression, security, and handover support. The RLC layer is associated with the transfer of packet data units (PDUs), error correction through automatic repeat request (ARQ), concatenation, segmentation, and reassembly of RLC service data units (SDUs). The MAC layer is associated with the mapping between logical channels and transport channels, multiplexing of MAC SDUs onto transport blocks (TBs), de-multiplexing of MAC SDUs from TBs, scheduling information reporting, error correction through hybrid ARQ (HARQ), priority handling, and logical channel prioritization. Each of the UEs 150 further provides layer 1 functionalities through a physical (PHY) layer, which is associated with error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing, etc.

In a 5G NR network, a base station such as a gNB may configure and activate a bandwidth part (BWP) for communication with UEs in a serving cell, through a radio resource control (RRC) configuration according to an RRC layer protocol. The activated BWP is referred to as the frequency resources, and the time scheduled for the communication is referred to as the time resources. The frequency resources and the time resources are herein collectively referred to as the time-and-frequency resources. Multiple time and frequency configurations are supported by NR. With respect to time resources, a frame may be 10 milliseconds (ms) length, and may be divided into ten subframes of 1 ms each. Each subframe may be further divided into multiple equal-length time slots (also referred to as slots), and the number of slots per subframe may be different in different configurations. Each slot may be further divided into multiple equal-length symbol durations (also referred to as symbols); e.g., 7 or 14 symbols, With respect to frequency resources, NR supports multiple different subcarrier bandwidths. Contiguous subcarriers (also referred to as resource elements (REs)) are grouped into one resource block (RB). In one configuration, one RB contains 12 subcarriers.

Figure 2:
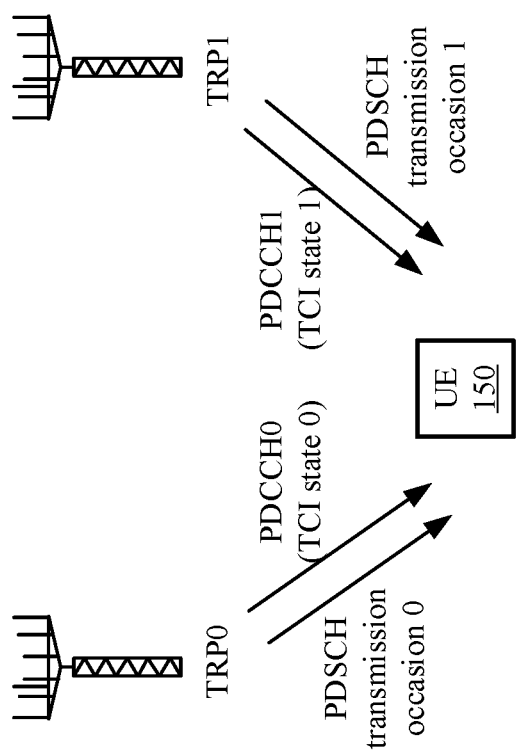
FIG. 2 illustrates an example of multiple PDCCH transmissions from M-TRP according to one embodiment.

FIG. 2 illustrates an example of multiple PDCCH transmissions from multiple TRPs. The repetitions of PDCCH transmissions from M-TRP can improve the reliability of the received DCI. In this example, two PDCCHs (e.g., PDCCH0 and PDCCH1) from two TRPs (e.g., TRP0 and TRP1) carry the same DCI with respect to power control information, resource allocation information for physical downlink shared channel (PDSCH), uplink scheduling grant, etc. The UE may selectively decode the DCI from either PDCCH0 or PDCCH1, depending on the signal quality of PDCCH0 and PDCCH1. Alternatively, the UE may combine the DCI from PDCCH0 and PDCCH1 to improve the signal gain. The transmissions from the two TRPs are from two different beams to achieve spatial diversity. Thus, two TCI states are activated in the UE's configuration to receive the DCI from the two different beams. Although two TRPs and two PDCCHs are shown, it is understood that the example can be applied to any number of TRPs and any number of PDCCHs.

When the transmissions by PDCCH0 and PDCCH1 occur in the same slot, the DCI payloads carried by these two PDCCHs have the same content. When the transmissions by PDCCH0 and PDCCH1 occur in two different slots, the DCI payloads carried by these two PDCCHs have the same content except for a slot offset value. The following examples in FIG. 3 and FIG. 4 provide further details.

For each downlink BWP configured to a UE in a serving cell, a UE can be configured by higher layer signaling (e.g., RRC) with a number of CORESETs and a number of search space sets (SS sets), where each SS set is associated with a CORESET. The SS set configuration indicates a search space ID, a CORESET ID, and a number of configuration parameters to be described below. In one embodiment, the SS set configuration can be dynamically updated by dynamic signaling such as MAC CEs or DCI.

The SS set configuration includes monitoringSlotPeriodicityAndOffset denoted herein as (monitoringSP, monitoringO), which indicates the length (number of slots) of a monitoring period of the SS set and the starting slot of the SS set. Another SS set parameter is duration denoted as D, which indicates the number of consecutive slots in which the SS set is present starting from the slot identified by monitoringO. Another SS set parameter is monitoringSymbolsWithinSlot denoted as a bit sequence (also referred to as a bit map), in which each bit corresponds to an OFDM symbol within the slot(s) in which the SS set occurs. For example, a bit map of 14 bits corresponds to 14 symbols and a bit value of one indicates a monitoring occasion of the SS set in the corresponding symbol.

In the following examples of FIGS. 3-7, a first TRP (TRP0) may transmit DCI0 via PDCCH0 to the UE, and a second TRP (TRP1) may transmit DCI1 via PDCCH1 to the UE. PDCCH0 and PDCCH1 are associated with two different TCI states. The UE performs blind decoding throughout SearchSpaceA and SearchSpaceB to detect PDCCH0 and PDCCH1, respectively. It is understood that FIGS. 3-7 provide non-limiting examples; many variations of intra- and/or inter-slot DCI repetitions (also referred to as PDCCH repetitions) can be achieved by configuring a UE's SS sets with different values of monitoringSlotPeriodicityAndOffset, duration, and/or monitoringSymbolsWithinSlot. In one embodiment, the repetition number of the DCI can be determined by the configuration of the SS sets, where the configuration including one or more of: monitoringSlotPeriodicityAndOffset, duration, and monitoringSymbolsWithinSlot.

FIG. 3 illustrates an example of intra-slot repetitions with two CORESETs according to one embodiment. Each rectangular block in FIG. 3 represents a monitoring occasion of an SS set. The UE is configured with SearchSpaceA and SearchSpaceB, which are SS sets in two corresponding CORESETs, CORESET0 and CORESET1, respectively. In this example, both SearchSpaceA and SearchSpaceB are configured to have monitoringSlotPeriodicityAndOffset= (monitoringSP, monitoringO)=(sl2, 0), which means that both SS sets occur every other slot beginning at slot 0. Moreover, in this example, the periodicity sl2 defines the length of the monitoring period=2 slots. Thus, the number of PDCCH repetitions (counting both SS sets) in one monitoring period is 2.

In the example of FIG. 3, DCI0 carried by PDCCH0 (in SearchSpaceA) and DCI1 carried by PDCCH1 (in SearchSpaceB) have the same DCI payload, as both SearchSpaceA and SearchSpaceB occur in the same slot.

Thus, the UE may selectively decode either DCI0 or DCI1 Alternatively, the UE may combine the payloads of DCI0 and DCI1 to improve the gain.

FIG. 4 illustrates an example of inter-slot repetitions with two CORESETs according to one embodiment. In this example, SearchSpaceA and SearchSpaceB, each of which belongs to a different CORESET, are configured to occur in two different slots. In this example, the slot periodicity monitoringSP for both SearchSpaceA and SearchSpaceB is sl2. The offset monitoringO for SearchSpaceA is 0 and for or SearchSpaceB is 1, which indicates that the first monitoring occasion of SearchSpaceA is in slot 0 and the first monitoring occasion of SearchSpaceB is in slot 1. Similar to FIG. 3, the periodicity sl2 defines the length of the monitoring period=2 slots, and the number of PDCCH repetitions in one monitoring period is 2. As SearchSpaceA and SearchSpaceB are located in two different slots, DCI0 and DCI1 are the same except for a slot offset field (Ko). The slot offset field is a field of one or two bits. The UE may selectively decode either DCI0 or DCI1. In an embodiment where the UE combines DCI0 payload and DCI1 payload to improve the gain, the slot offset value in one DCI payload (e.g., DCI1) may be replaced by a corresponding slot offset value in the other DCI payload (e.g., DCI0) to allow the UE to combine two identical DCI payloads. Alternatively, the UE may exclude both slot offset values in DCI0 payload and DCI1 payload when combining the two DCI payloads. The selective decoding or combining of DCI received in the same slot and/or different slots applies to all of the examples in this disclosure.

FIG. 5 illustrates an example of intra-slot repetitions with two CORESETs according to one embodiment. SearchSpaceA and SearchSpaceB are SS sets in CORESET0 and CORESET1, respectively. In this example, both SS sets occur in each slot beginning from slot 0, as indicated by the slot periodicity monitoringSP=sl1 and the offset monitoringO=0 for both SS sets. The duration D for both SearchSpaceA and SearchSpaceB is 1. The parameter monitoringSymbolsWithinSlot for SearchSpaceA is 10000001000000 and for SearchSpaceB is 00010000001000, which indicates the two symbol locations for monitoring PDCCH in each SS set. Thus, the monitoring period=1 slot and the number of PDCCH repetitions in one monitoring period is 4.

FIG. 6 illustrates an example of intra-and-inter-slot repetitions with two CORESETs according to another embodiment. SearchSpaceA and SearchSpaceB are SS sets in CORESET0 and CORESET1, respectively. In this example, the monitoring occasions for both SS sets repeat with a periodicity of 2 slots beginning at slot 0, as indicated by monitoringSP=sl2 and monitoringO=0 for both SS sets. The duration D for both SS sets is 2, indicating the monitoring occasions for both SS sets repeats for 2 slots (slot 0 and slot 1). The parameter monitoringSymbolsWithinSlot for SearchSpaceA is 10000000000000 and for SearchSpaceB is 00000001000000, which indicates the one symbol location for monitoring PDCCH in each SS set. Thus, the monitoring period=2 slots, and the number of repetitions in one monitoring period is 4.

Figures 7, 8:
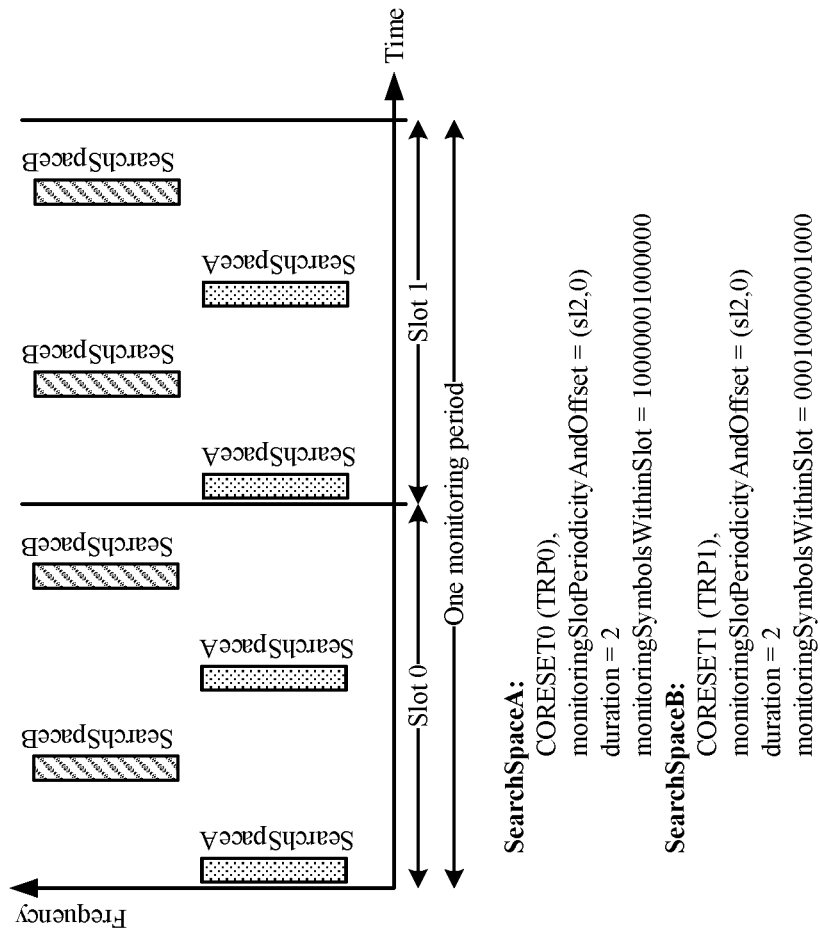
FIG. 7 illustrates an example of intra-and-inter-slot repetitions with two CORESETs according to another embodiment.
FIG. 8 illustrates an example of a MAC CE according to one embodiment.

FIG. 7 illustrates an example of intra-and-inter-slot repetitions with two CORESETs according to another embodiment. SearchSpaceA and SearchSpaceB are SS sets in CORESET0 and CORESET1, respectively. In this example, the monitoring occasions for both SS sets repeat with a periodicity of 2 slots beginning at slot 0, as indicated by monitoringSP=sl2 and monitoringO=0 for both SS sets. The duration D for both SS sets is 2, indicating that the monitoring occasions for both SS sets repeat for 2 slots. The parameter monitoringSymbolsWithinSlot for SearchSpaceA is 10000001000000 and for SearchSpaceB is 00010000001000, which indicates the two symbol locations for monitoring PDCCH in each SS set. Thus, the monitoring period=2 slots, and the number of repetitions in one monitoring period is 8.

In the examples of FIGS. 3-7, two SS sets SearchSpaceA and SearchSpaceB are associated with each other for providing PDCCH repetitions. This association can be indicated to a UE and dynamically activated and deactivated by a dynamic indication, such as MAC CE, DCI, etc. FIG. 8 illustrates an example of a MAC CE 800 that can be transmitted from a base station to a UE according to one embodiment. The MAC CE 800 updates the UE's configuration to dynamically activate or deactivate the association of multiple SS sets for providing PDCCH repetitions. The MAC CE 800 identifies multiple SS sets, which may belong to one or more CORESETs. The MAC CE 800 is a bit string that is byte aligned (e.g., multiple of 8 bits) in length. The MAC CE 800 includes (k+1) 8-bit segments (i.e., bytes), with each byte shown as a row in the figure.

In one embodiment, the MAC CE 800 includes an A/D field 801, which is a one-bit field indicating whether to activate or deactivate associated SS sets for PDCCH repetitions. For example, the A/D field 801 is set to 1 to indicate activation, otherwise, it is set to zero to indicate deactivation. The MAC CE 800 also includes a serving cell ID 802 and a BWP ID 803 for which the MAC CE applies. The MAC CE 800 further includes a set of search space IDs 806, which identifies the SS sets being associated or de-associated for PDCCH repetitions. For activating or deactivating the associations between SearchSpaceA and SearchSpaceB in the examples of FIGS. 3-7, the MAC CE 800 identifies the search space IDs of SearchSpaceA and SearchSpaceB.

The MAC CE 800 further includes an extension (E) field 804, which is a one-bit flag indicating whether or not the octet including this field is the last octet in the MAC CE 800. A reserved (R) field 805 may be set to zero.

FIGS. 9-15 illustrate examples of PDCCH repetitions provided by multiple PDCCH monitoring occasions in one CORESET. These PDCCH repetitions may indicate the same PDSCH allocation which has multiple PDSCH transmission occasions. The DCI payload transmitted in the repetitions is the same.

The CORESET in the examples of FIG. 9-15 may be associated with one or more SS sets (e.g., SearchSpaceA and/or SearchSpaceB). Each SS set may be configured with one or more TCI states (e.g., TCI0 and/or TCI1). Although one or two SS sets are shown in the examples of FIG. 9-15, it is understood that more than two SS sets may be used to provide PDCCH repetitions.

The configuration of the SS sets in the examples of FIGS. 9-15 includes the aforementioned monitoringSlotPeriodicityAndOffset, duration, and monitoringSymbolsWithinSlot. In one embodiment, the SS set configuration may also include the parameter TCIstatesSearchSpace, which is a bit string (e.g., a bit map) with each bit corresponding to a TCI state; e.g., the first bit corresponds to TCI state 0 and the second bit corresponds to TCI state 1. For example, TCIstatesSearchSpace=10 indicates that the SS set is associated with TCI state 0, TCIstatesSearchSpace=01 indicates that the SS set is associated with TCI state 1, and TCIstatesSearchSpace=11 indicates that the SS set is associated with TCI state 0 and TCI state 1 in different monitoring occasions. This bit map identifies one or more TCI states associated with a corresponding SS set in the CORESET. A UE may receive a dynamic indication (e.g., MAC CE, DCI, etc.) of updating the bit map to change an association between the one or more TCI states and the corresponding SS set.

Additionally, the SS set configuration may also include repetitionSlotPeriodicityAndOffset=(repetitionSP, repetitionO). The parameter repetitionSP indicates the number of slots in which the monitoring occasions of the SS set are counted towards the PDCCH repetition, and repetitionO indicates the starting slot to count those monitoring occasions. When an SS set does not contribute to the PDCCH repetition, its repetitionSlotPeriodicityAndOffset may be set to the same value as monitoringSlotPeriodicityAndOffset. The parameter repetitionSlotPeriodicityAndOffset provides an additional tool to specify which of the SS set's monitoring occasions are counted in (i.e., contribute to) the PDCCH repetitions. When repetitionSlotPeriodicityAndOffset is used in the SS set configuration, the length of a monitoring period (defined by monitoringSP) may be different from the length of a repetition period (defined by repetitionSP), and the number of repetitions is determined by the number of contributing monitoring occasions in the repetition period.

Alternatively, the SS set configuration may include a configurable parameter that specifies the number of repetitions. For example, repetitionNumberPDCCH=N means that there are N monitoring occasions with two (or more) TCI states in a repetition period, the number N being independent of the number of monitoring occasions within a slot or a monitoring period. The parameter repetitionNumberPDCCH can be, but is not limited to, a part of an SS set configuration.

In one embodiment, one or more parameters in the SS set configuration described herein can be updated by a dynamic indication such as MAC CEs or DCI. For example, a MAC CE can update TCIstateSearchSpace and/or repetitionNumberPDCCH to enable or disable PDCCH repetitions from M-TRP.

It is understood that FIGS. 9-15 provide non-limiting examples; many variations of intra- and/or inter-slot PDCCH repetition can be achieved by configuring a UE's SS sets with different values of a combination of the aforementioned parameters.

FIG. 9 illustrates an example of inter-slot repetitions with one CORESET according to one embodiment. In this example, SearchSpaceA and SearchSpaceB belong to the same CORESET, but only SearchSpaceB contributes to the PDCCH repetitions. For SearchSpaceB, the slot periodicity monitoringSP is sl2 (i.e., 2 slots) and the offset monitoringO is 1 (e.g., slot 1). Additionally, duration D=1 and monitoringSymbolsWithinSlot=10000000000000, repetitionSP=sl4, repetitionO=1, and TCIstatesSearchSpace=11. The configuration indicates that the two monitoring occasions of SearchSpaceB in slot 1 and slot 3 (with boldface and underlined captions) with TCI state 0 and TCI state 1, respectively, provide two PDCCH repetitions. Thus, DCI can be transmitted in slot 1 from TRP0 via PDCCH0, and the same DCI is repeated in slot 3 from TRP1 via PDCCH1, where PDCCH0 and PDCCH1 are provided by SearchSpaceB. The repetitions may continue such that, in the next repetition period, SearchSpaceB in slot 5 and slot 7 provides the next two PDCCH repetitions. In an alternative embodiment where repetitionSP=sl8 for SearchSpaceB, the four monitoring occasions of SearchSpaceB in slots 1, 3, 5, and 7 provide four repetitions for the PDCCH repetitions.

FIG. 10 illustrates an example of inter-slot repetitions with one CORESET according to another embodiment. In this example, only SearchSpaceA contributes to the PDCCH repetitions. For SearchSpaceA, the slot periodicity monitoringSP is sl4 (i.e., 4 slots) and the offset monitoringO is 0. Additionally, duration D=2, monitoringSymbolsWithinSlot=10000000000000, and TCIstatesSearchSpace=11. The configuration indicates that the two monitoring occasions of SearchSpaceA in slot 0 and slot 2 (with boldface and underlined captions) with TCI state 0 and TCI state 1, respectively, provide two PDCCH repetitions. The repetitions may continue such that, in the next monitoring period, SearchSpaceA in slot 4 and slot 5 provides the next two PDCCH repetitions. In this example, repetitionSlotPeriodicityAndOffset is not used.

FIG. 11 illustrates an example of intra-slot repetitions with one CORESET according to one embodiment. In this example, SearchSpaceA and SearchSpaceB belong to the same CORESET, but only SearchSpaceB contributes to the PDCCH repetitions. The configuration of SearchSpaceB indicates that there are four monitoring occasions of SearchSpaceB within a slot, with slot periodicity of 2 slots, 1 slot offset, and duration D=1. With TCIstatesSearchSpace=11 and a cyclic mapping of the TCI states, the configuration further indicates that the four monitoring occasions in slot 1 (with boldface and underlined captions) with TCI state 0 and TCI state 1, respectively, provide four repetitions for the PDCCH repetitions. The cyclic mapping indicates that the TCI states alternate between 0 and 1 for the monitoring occasions of SearchSpaceB. In an embodiment where there are more than two TCI states, the PDCCH monitoring occasions with the cyclic mapping are mapped to TCI states in a round-robin fashion (e.g., TCI state 0, TCI state 1, TCI state 2, . . . , TCI state 0, TCI state 1, TCI state 2, . . . , etc.). A UE may be configured with the cyclic mapping in a configuration of a corresponding SS set.

FIG. 12 illustrates an example of intra-slot repetitions with one CORESET according to one embodiment. This example is the same as the example in FIG. 11, except that the TCI state mapping is sequential. The configuration indicates that the four monitoring occasions of SearchSpaceB in slot 1 (with boldface and underlined captions) with TCI state 0 and TCI state 1, respectively, provide four repetitions for the PDCCH repetitions, and the TCI state changes from 0 and 1 after the first two monitoring occasions of SearchSpaceB. In an embodiment where there are more than two TCI states, the PDCCH monitoring occasions with the sequential mapping are mapped to TCI states sequentially (e.g., TCI state 0, TCI state 0, . . . , TCI state 1, TCI state 1, . . . , TCI state 2, TCI state 2, . . . , etc.). A UE may be configured with the sequential mapping in a configuration of a corresponding SS set.

Figure 13:
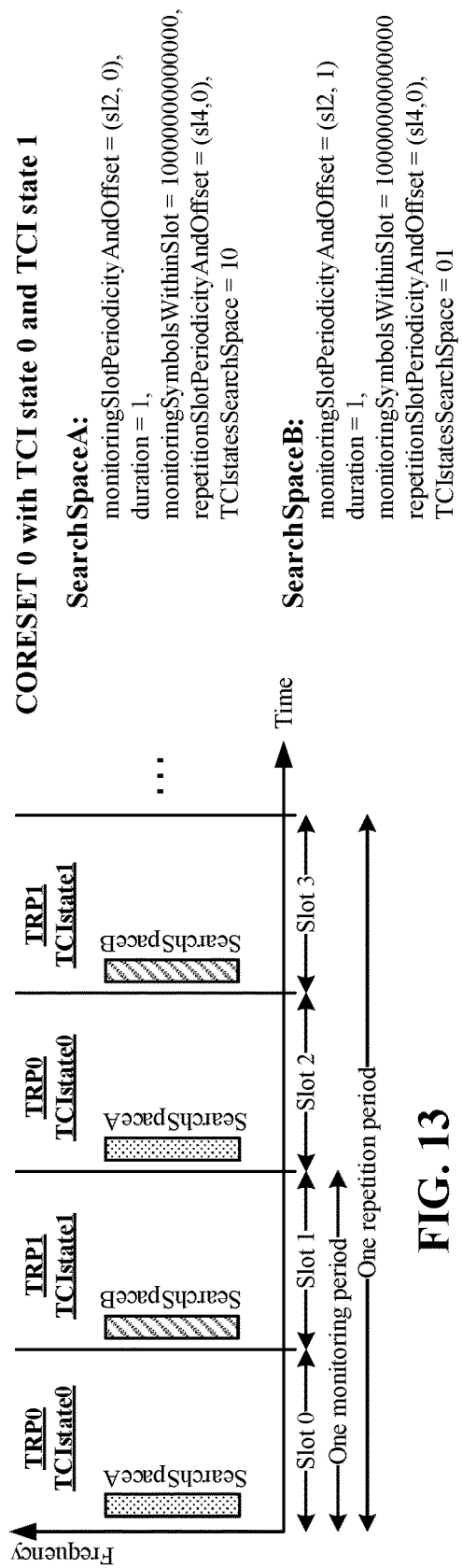
FIG. 13 illustrates an example of inter-slot repetitions with one CORESET according to one embodiment.

FIG. 13 illustrates an example of inter-slot repetitions with one CORESET according to one embodiment. In this example, both SearchSpaceA and SearchSpaceB belong to the same CORESET and contribute to the PDCCH repetitions. The slot periodicity monitoringSP for both SS sets is sl2 and the offset monitoringO of SearchSpaceA and SearchSpaceB is 0 and 1, respectively. For both SS sets, duration D=1 and monitoringSymbolsWithinSlot=10000000000000. Additionally, SearchSpaceA and SearchSpaceB are associated with TCI states 0 and 1, respectively, as indicated by their respective TCIstatesSearchSpace configuration parameters. Both SS sets have repetitionSP=sl4 and repetitionO=0, indicating that the repetition period is 4 slots starting from slot 0. Thus, the repetition number is four, provided by the monitoring occasions of both SS sets in slots 0-3. The same DCI can be transmitted in slots 0 and 2 from TRP0 via PDCCH0, and in slots 1 and 3 from TRP1 via PDCCH1, where PDCCH0 and PDCCH1 belong to SearchSpaceA and SearchSpaceB, respectively, in the same CORESET.

Figure 14:
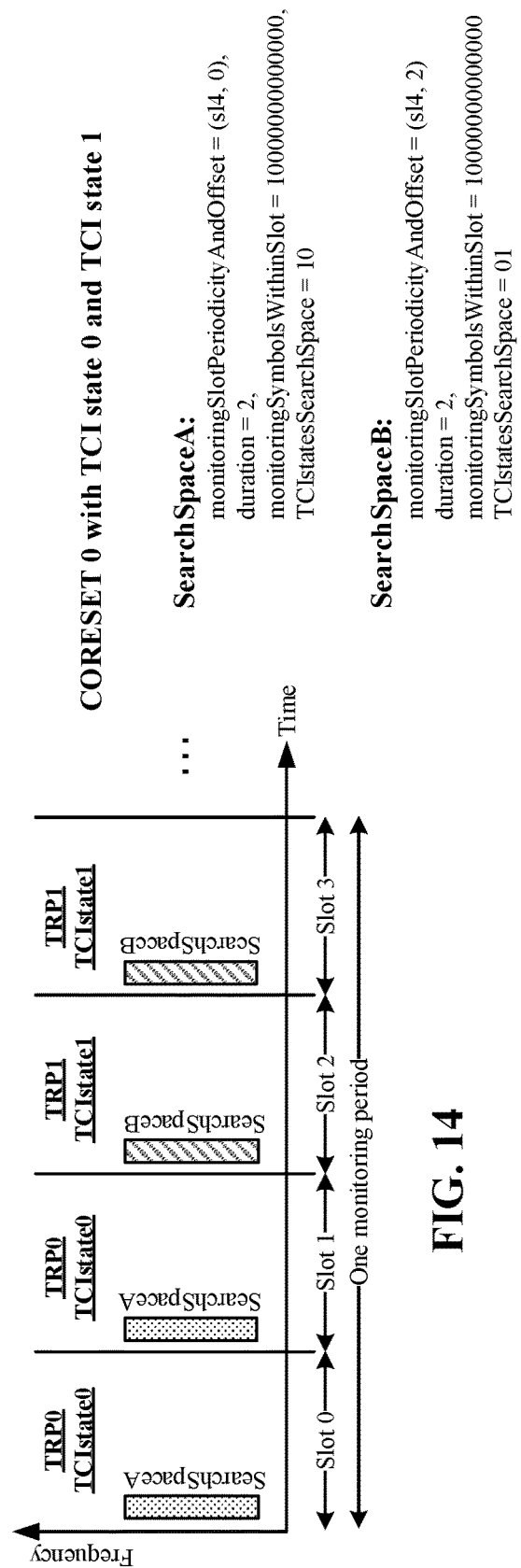
FIG. 14 illustrates an example of inter-slot repetitions with one CORESET according to one embodiment.

FIG. 14 illustrates an example of inter-slot repetitions with one CORESET according to another embodiment. This example is the same as the example in FIG. 13, except that duration D=2 and repetitionSlotPeriodicityAndOffset is not used. The repetition number is four, provided by the monitoring occasions of both SS sets in slots 0-3.

Figure 15:
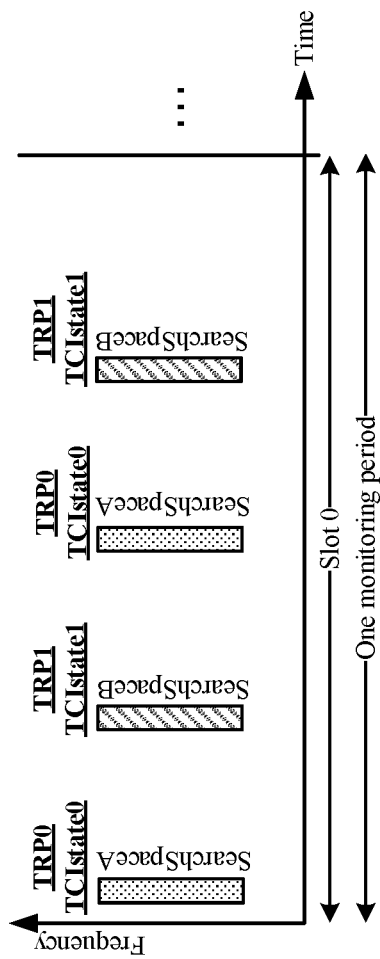
FIG. 15 illustrates an example of intra-slot repetitions with one CORESET according to one embodiment.

FIG. 15 illustrates an example of intra-slot repetitions with one CORESET according to one embodiment. In this example, both SearchSpaceA and SearchSpaceB belong to the same CORESET and contribute to the PDCCH repetitions. The configuration parameters indicate that there are two monitoring occasions of each SS set within a slot. The parameter repetitionSlotPeriodicityAndOffset is not used; instead, the parameter repetitionNumberPDCCH=4 is used to indicate the repetition number to be four.

Figure 16:
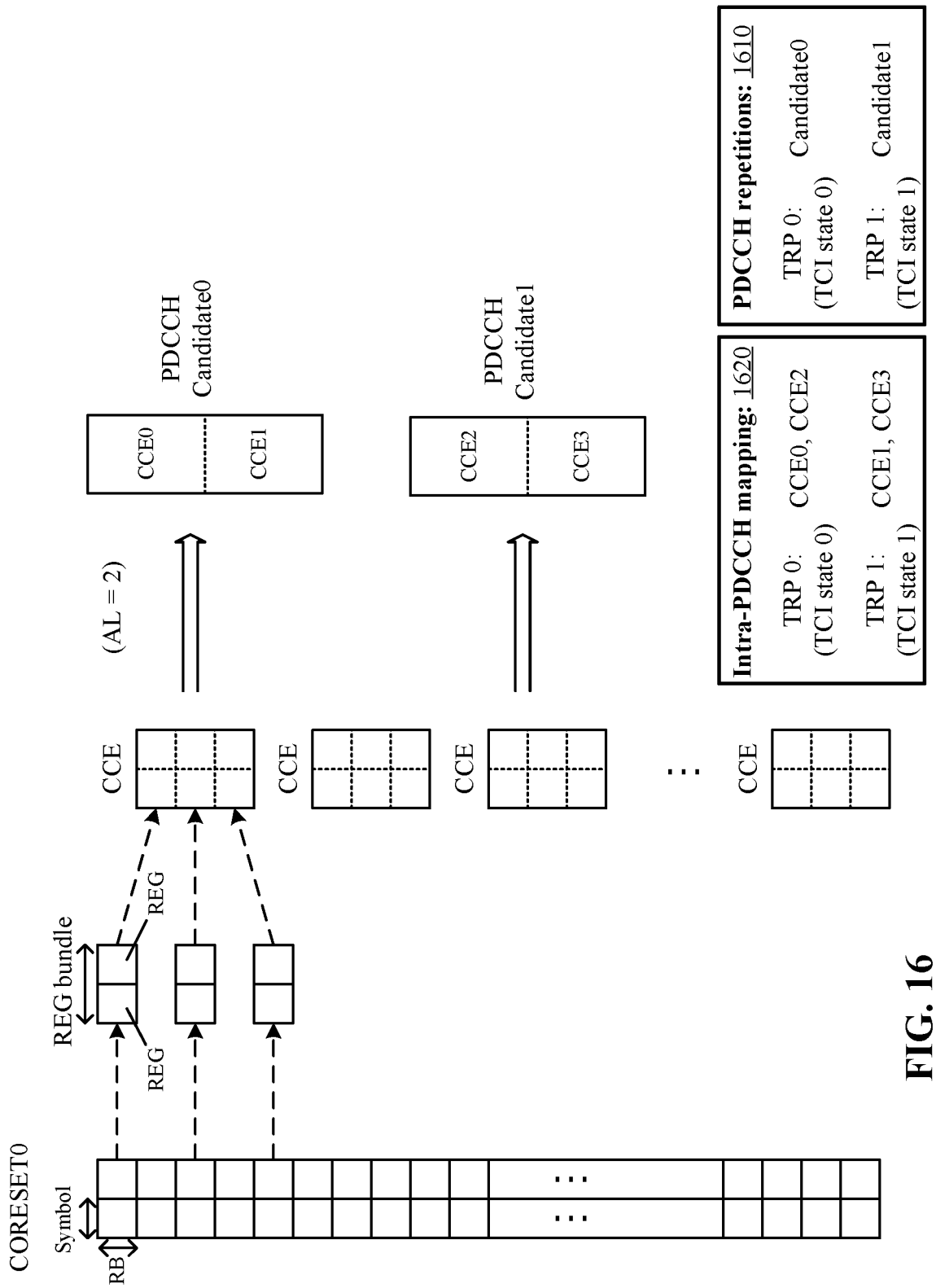
FIG. 16 is a diagram illustrating resource units in a CORESET at different levels of granularities according to one embodiment.

FIG. 16 is a diagram illustrating resource units in a CORESET at different levels of granularities according to one embodiment. A set of these resource units is mapped to a PDCCH candidate.

A DCI payload is scrambled, modulated, and mapped to a set of physical resource units called control channel elements (CCEs). This CCE set provides the physical resources for the PDCCH that carries the DCI in downlink transmission. Each CCE consists of six resource element groups (REGs), where a REG is defined as one RB in one OFDM symbol. The mapping between CCE and REG can be interleaved or non-interleaved. The number of CCEs in a PDCCH candidate is referred to as an aggregation level (AL). A REG bundle is a set of indivisible resources consisting of neighboring REGs. A REG bundle spans across all OFDM symbols in the given CORESET.

A DCI is mapped to physical resources in time and frequency, and these physical resources are configured to a UE by a CORESET configuration. A CORESET is configured with a number of RBs in the frequency domain and a number of symbols in the time domain. Multiple search spaces can be configured to be associated with the CORESET. Each search space includes one or more PDCCH candidates that can be chosen to carry the DCI. The chosen PDCCH candidate is the PDCCH allocated with frequency-and-time resources to carry the DCI in downlink transmission. In one embodiment, a UE's configuration may indicate, for each of the activated TCI states, a group of PDCCH candidates in a CORESET that are associated with the activated TCI state.

When a CORESET is configured with multiple TCI states, each TCI state (indicating a corresponding TRP) can be mapped to a set of PDCCH candidates. The association between the TCI states and the PDCCH candidates in the CORESET can be indicated to a UE and stored at the UE as a configuration. In the aforementioned examples, DCI is transmitted via PDCCH repetitions; e.g., the same DCI is transmitted via two PDCCHs selected from a set of PDCCH candidates, with each PDCCH associated with a different TCI state and a different TRP. In a configuration 1610 of PDCCH repetitions, two PDCCH candidates, candidate0 and candidate1, are associated with TCI state 0 and TCI state 1, respectively. Thus, TRP0 may transmit DCI using candidate0 in a first time instance, and TRP1 may transmit the same DCI using candidate 1 in a second time instance. In a configuration 1620 of intra-PDCCH mapping, four CCEs are mapped to two TCI states. Thus, in this example, each PDCCH candidate consists of CCEs of both TCI states. TRP0 may transmit a first portion of DCI using CCE0, and TRP1 may transmit a second portion of the DCI using CCE1, where CCE0 and CCE1 are resource units of candidate0. To repeat the DCI transmission, TRP0 may transmit a first portion of the same DCI using CCE2, and TRP1 may transmit a second portion of the DCI using CCE3, where CCE2 and CCE3 are resource units of candidate1. Resource units at different levels of granularities can be used for M-TRP transmission based on intra-PDCCH mapping, as will be described in more detail with reference to FIGS. 18A-18E.

Figure 17:
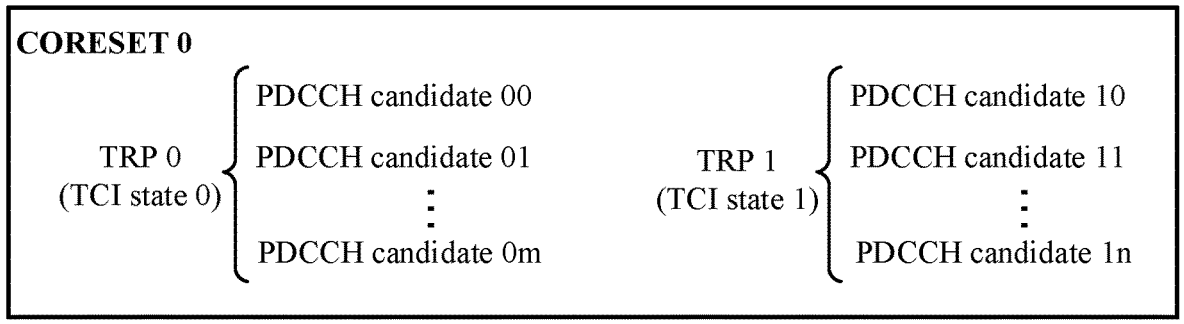
FIG. 17 is an example illustrating TCI states mapped to PDCCH candidates in a CORESET according to one embodiment.

FIG. 17 is an example illustrating TCI states mapped to PDCCH candidates in a CORESET according to one embodiment. This embodiment describes the configuration 1610 (FIG. 16) in more detail. In this example, TCI state 0 is mapped to a first group of (m+1) PDCCH candidates and TCI state 1 is mapped to a second group of (n+1) PDCCH candidates. Different groups of PDCCH candidates are allocated with different resources in time and/or frequency belonging to one CORESET. For example, a first TRP may transmit DCI via a first PDCCH, which is one of the PDCCH candidates in the first group, and a second TRP may transmit the same DCI via a second PDCCH, which is one of the PDCCH candidates in the second group. The DCI transmitted by the first and the second TRPs conveys the same downlink allocation for PDSCH. Moreover, the single-CORESET PDCCH repetitions described in connection with FIGS. 9-15 and their variations can be applied to these PDCCH candidates of multiple TCI states. For example, the first group of PDCCH candidates may be mapped to a first SS set (e.g., SearchSpaceA) and the second group of PDCCH candidates may be mapped to a second SS set (e.g., SearchSpaceB) as in the example of FIGS. 13 and 14. As another example, both the first and the second groups of PDCCH candidates may be mapped to one of the SS sets (e.g., SearchSpaceB in FIGS. 11 and 12).

FIGS. 18A-18E illustrate configurations of TCI states mapped to resource units of different levels of granularities in a CORESET according to some embodiments. Each configuration indicates groups of resource units in a single CORESET mapped to respective TCI states. The resource units may be resources in time, frequency, or a combination of both time and frequency, such as REGs, REG bundles, CCEs, RBs, OFDM symbols, etc. In these examples, two TCI states and their corresponding two TRPs are shown. It is understood that more than two TCI states may be configured and mapped to their corresponding groups of resource units.

Figure 18A:
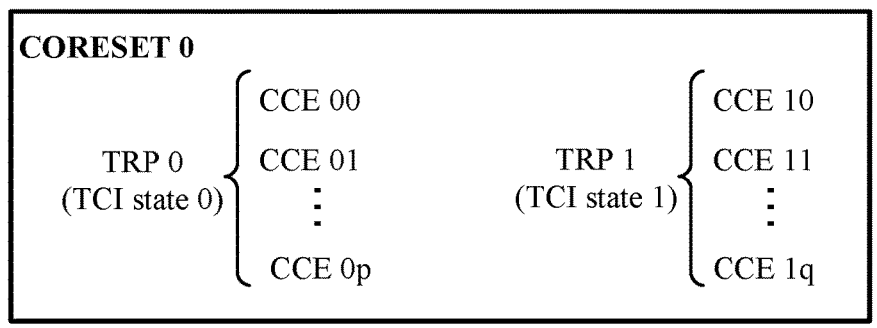
FIGS. 18A, 18B, 18C, 18D, and 18E illustrate configurations of TCI states mapped to resource units of different levels of granularities in a CORESET according to some embodiments.
Figure 18B:
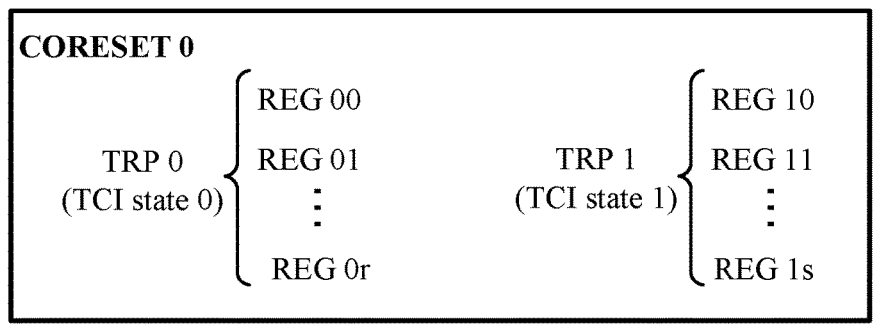
Figure 18C:
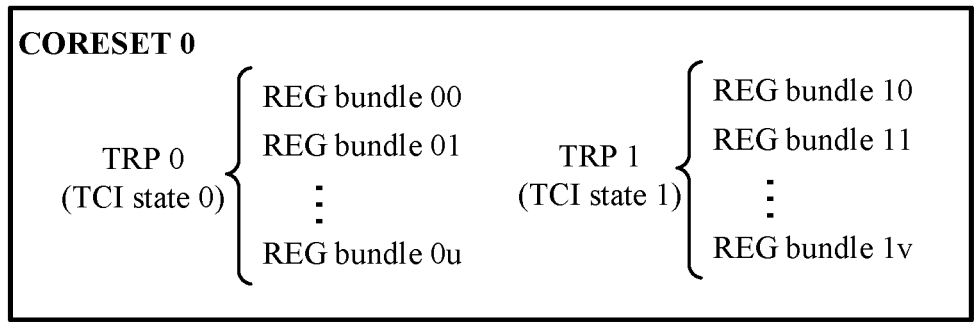
Figure 18D:
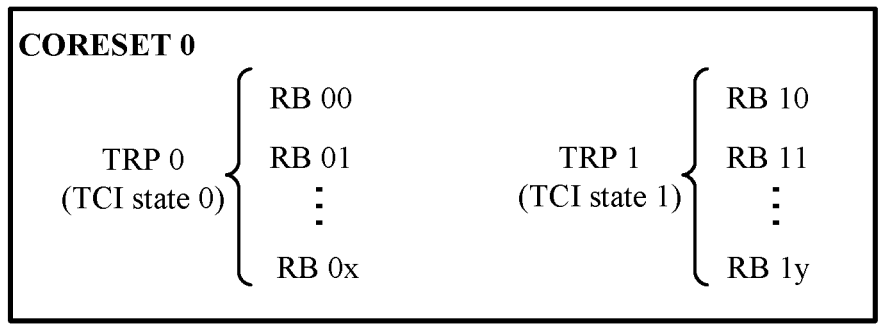
Figure 18E:
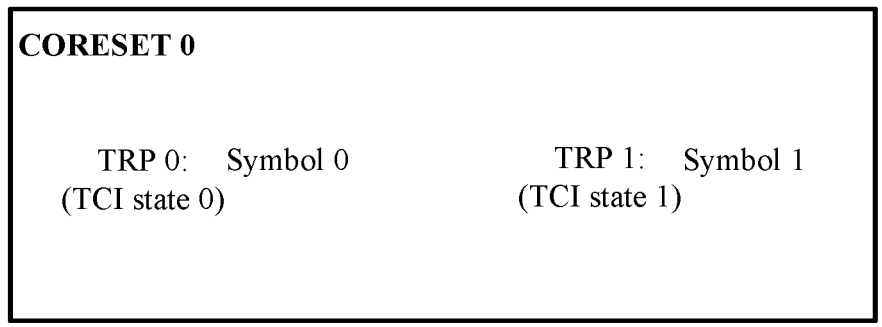

FIG. 18A shows an example of a mapping between two TCI states and two groups of CCEs; FIG. 18B shows an example of a mapping between two TCI states and two groups of REGs; FIG. 18C shows an example of a mapping between two TCI states and two groups of REG bundles; FIG. 18D shows an example of a mapping between two TCI states and two groups of RBs; and FIG. 18E shows an example of a mapping between two TCI states and two groups of symbols (only one symbol in each group is shown as an example).

One PDCCH can be transmitted by one TRP using a group of resource units that are mapped to one TCI state, where the resource units may be at a CCE level, a REG level, a REG bundle level, an RB level, or an OFDM symbol level in one CORESET. In one embodiment, one PDCCH can be transmitted by multiple TRPs (M-TRP) using multiple groups of resource units that are mapped to multiple TCI states, where the resource units may be at a CCE level, a REG level, a REG bundle level, an RB level, or an OFDM symbol level in one CORESET. For example, a PDCCH may be transmitted by both TRP0 and TRP1 using CCEs associated with TCI state 0 and CCEs associated with TCI state 1.

Moreover, the one-CORESET PDCCH repetitions described in connection with FIGS. 9-15 and their variations can be applied to the mapping of the TCI states described herein. For example, two TRPs can transmit DCI via two corresponding sets of resource units of one PDCCH in a first time instance. Then the two TRPs can transmit the same DCI via another two corresponding sets of resource units of another PDCCH in a second time instance to achieve DCI repetitions. The resource units may be at a CCE level, a REG level, a REG bundle level, an RB level, or an OFDM symbol level in one CORESET.

Figure 19:
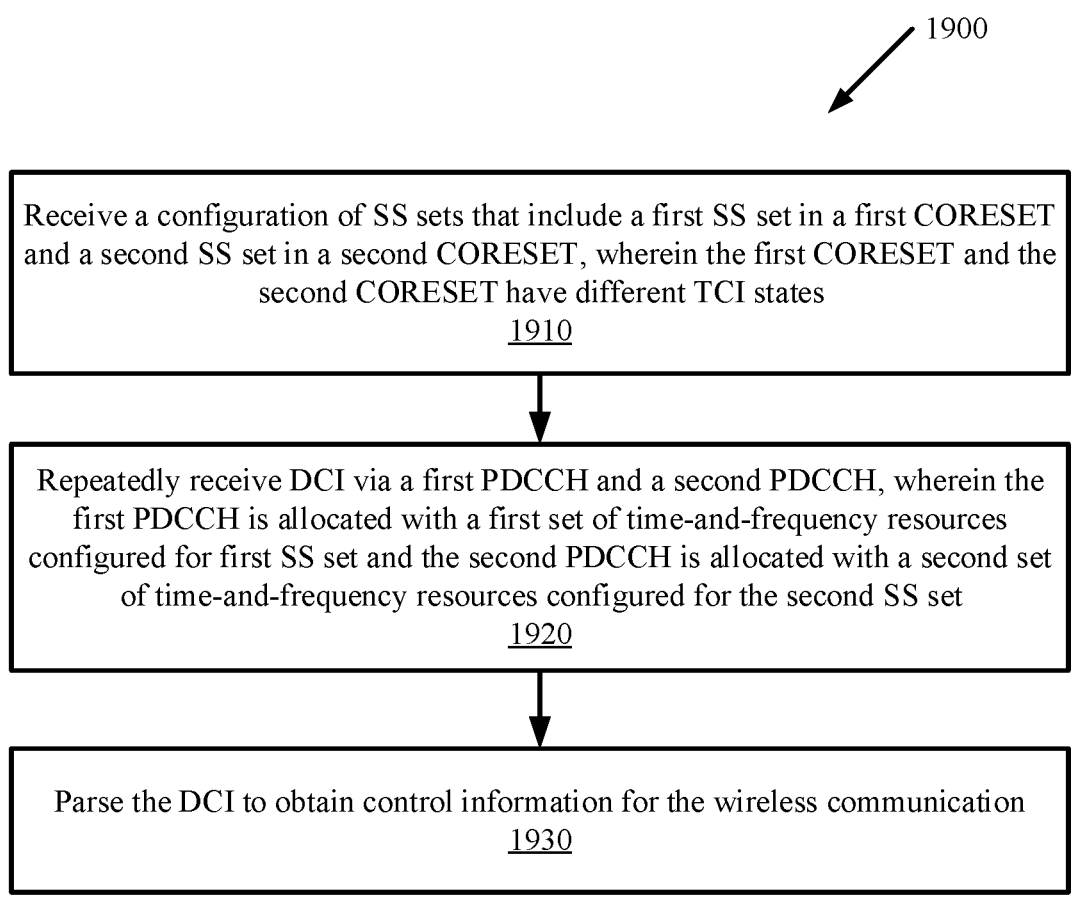
FIG. 19 is a flow diagram illustrating a method performed by a UE in a wireless network according to one embodiment.

FIG. 19 is a flow diagram illustrating a method 1900 performed by a UE in a wireless network according to one embodiment. The UE may be the UE 150 in FIGS. 1 and 2, and/or the apparatus 2200 in FIG. 22. The method 1900 begins at step 1910 when the UE receives a configuration of SS sets that include a first SS set in a first CORESET and a second SS set in a second CORESET. The first CORESET and the second CORESET have different TCI states. The UE at step 1920 repeatedly receives DCI via a first PDCCH and a second PDCCH, wherein the first PDCCH is allocated with a first set of time-and-frequency resources configured for the first SS set and the second PDCCH is allocated with a second set of time-and-frequency resources configured for the second SS set. The UE at step 1930 parses the received DCI to obtain control information for the wireless communication.

Figure 20:
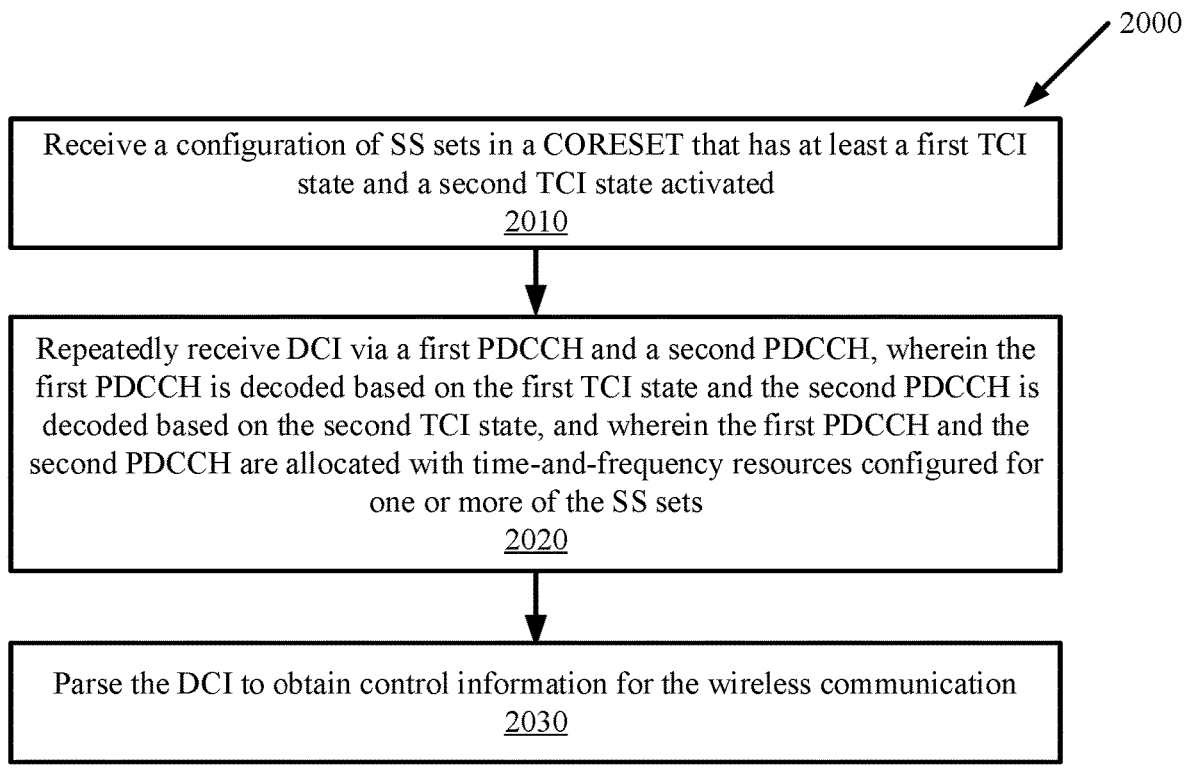
FIG. 20 is a flow diagram illustrating a method performed by a UE in a wireless network according to another embodiment.

FIG. 20 is a flow diagram illustrating a method 2000 performed by a UE in a wireless network according to another embodiment. The UE may be the UE 150 in FIGS. 1 and 2, and/or the apparatus 2200 in FIG. 22. The method 2000 begins at step 2010 when the UE receives a configuration of SS sets in a CORESET that has at least a first TCI state and a second TCI state activated. The UE at step 2020 repeatedly receives DCI via a first PDCCH and a second PDCCH, wherein the first PDCCH is decoded based on the first TCI state and the second PDCCH is decoded based on the second TCI state. The first PDCCH and the second PDCCH are allocated with time-and-frequency resources configured for one or more of the SS sets. The UE at step 2030 parses the received DCI to obtain control information for the wireless communication.

Figure 21:
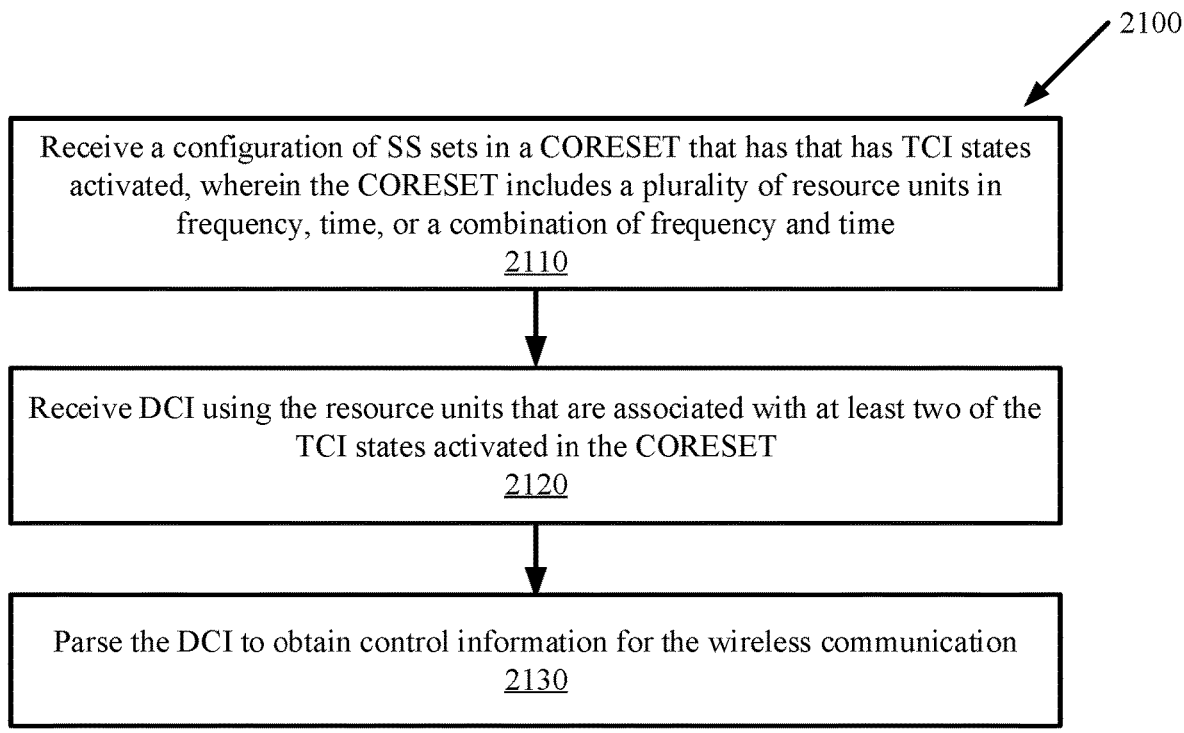
FIG. 21 is a flow diagram illustrating a method performed by a UE in a wireless network according to yet another embodiment.

FIG. 21 is a flow diagram illustrating a method 2100 performed by a UE in a wireless network according to another embodiment. The UE may be the UE 150 in FIGS. 1 and 2, and/or the apparatus 2200 in FIG. 22. The method 2100 begins at step 2110 when the UE receives a configuration of SS sets in a CORESET that has TCI states activated, wherein the CORESET includes a plurality of resource units in frequency, time, or a combination of frequency and time. The UE at step 2120 receives DCI using the resource units that are associated with at least two of the TCI states activated in the CORESET. The UE at step 2130 parses the received DCI to obtain control information for the wireless communication. In one embodiment, each resource unit is one of: a CCE, an REG, a REG bundle, an RB, or an OFDM symbol. In one embodiment, the UE may repeatedly receive the DCI via at least two PDCCHs associated with the at least two TCI states.

Figure 22:
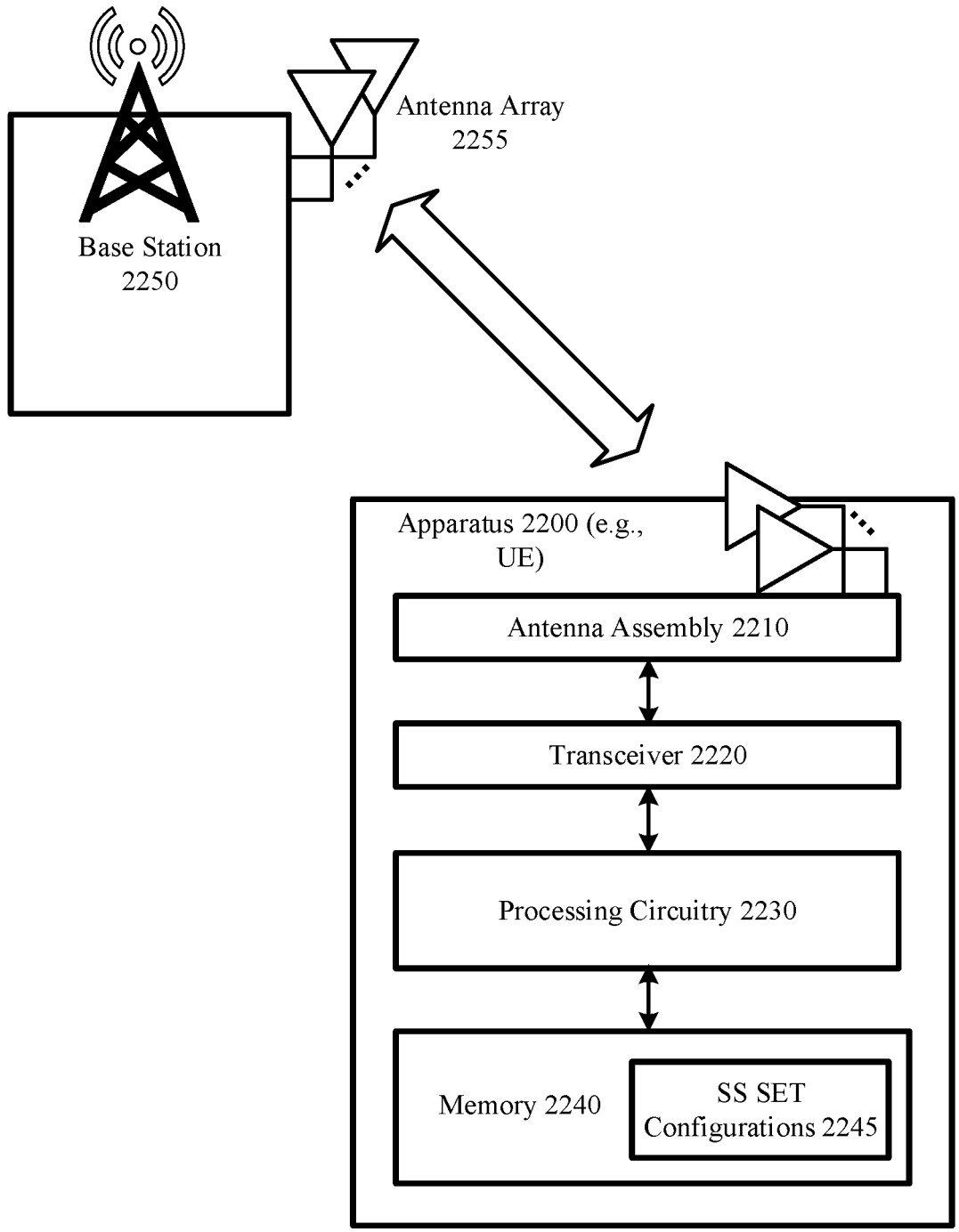
FIG. 22 is a block diagram illustrating an apparatus that performs wireless communication according to one embodiment.

FIG. 22 is a block diagram illustrating elements of an apparatus 2200 performing wireless communication with a base station 2250 according to one embodiment. In one embodiment, the apparatus 2200 may be a UE and the base station 2250 may be a gNb or the like, both of which may operate in a wireless network, such as the wireless network 100 in FIG. 1. In one embodiment, the apparatus 2200 may be the UE 150 in FIG. 1 and FIG. 2. In one embodiment, the base station 2250 includes an antenna array 2255 to form beams for transmitting and receiving signals.

As shown, the apparatus 2200 may include an antenna assembly 2210; e.g., MIMO antenna arrays, to support beamforming operations, and a transceiver circuit (also referred to as a transceiver 2220) including a transmitter and a receiver configured to provide radio communications with another station in a radio access network. The transmitter and the receiver may include filters in the digital front end for each cluster, and each filter can be enabled to pass signals and disabled to block signals. The transceiver 2220 is operative to receive downlink signals (e.g., MAC CEs, DCI, RRC, etc.) and transmit uplink signals. The apparatus 2200 may also include processing circuitry 2230 which may include one or more control processors, signal processors, central processing units, cores, and/or processor cores. The apparatus 2200 may also include a memory circuit (also referred to as memory 2240) coupled to the processing circuitry 2230. The memory 2240 may store configurations for supporting wireless communication, including SS set configurations 2245 that can be configured and updated to indicate the number and the pattern of PDCCH repetitions.

The processing circuitry 2230 is coupled to the memory 2240 and operative to update the SS set configurations. The apparatus 2200 may also include an interface (such as a user interface). The apparatus 2200 may be incorporated into a wireless system, a station, a terminal, a device, an appliance, a machine, and IoT operable to perform wireless communication in a multi-access network, such as a 5G NR network. It is understood the embodiment of FIG. 22 is simplified for illustration purposes. Additional hardware components may be included.

In one embodiment, the apparatus 2200 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 2240 may include a non-transitory computer-readable storage medium that stores computer-readable program code. The code, when executed by the processors, causes the processors to perform operations according to embodiments disclosed herein. Although the apparatus 2200 is used in this disclosure as an example, it is understood that the methodology described herein is applicable to any computing and/or communication device capable of performing wireless communications.

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuity in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method of wireless communication performed by a user equipment (UE), comprising:
   receiving a configuration of search space (SS) sets that include a first SS set in a first control resource set (CORESET) and a second SS set in a second CORESET, wherein the first CORESET and the second CORESET have different transmission configuration indication (TCI) states;
   repeatedly receiving downlink control information (DCI) via a first physical downlink control channel (PDCCH) and a second PDCCH, wherein the first PDCCH is allocated with a first set of time-and-frequency resources configured for the first SS set and the second PDCCH is allocated with a second set of time-and-frequency resources configured for the second SS set,
   wherein the repeatedly receiving the DCI further comprises:
      receiving, in two different slots, a first DCI payload and a second DCI payload via the first PDCCH and the second PDCCH, respectively; and
      combining the first DCI payload and the second DCI payload to obtain combined DCI without combining respective values in a slot offset field of respective payloads; and
   parsing the combined DCI to obtain control information for the wireless communication.

2. The method of claim 1, further comprising:
   receiving a first dynamic indication of activating an association between the first SS set and the second SS set for PDCCH repetitions.

3. The method of claim 2, further comprising:
   receiving a second dynamic indication of deactivating the association between the first SS set and the second SS set; and
   independently decoding the first PDCCH and the second PDCCH.

4. The method of claim 1, further comprising:
   receiving a medium access control (MAC) control element (CE) to activate or deactivate the association between the first SS set and the second SS set for PDCCH repetitions.

5. The method of claim 1, wherein repeatedly receiving the DCI further comprises:
   receiving a same DCI payload in a same slot from a first transmit receive point (TRP) via the first PDCCH and from a second TRP via the second PDCCH.

6. The method of claim 1, wherein repeatedly receiving the DCI further comprises:
   replacing a slot offset value in the second DCI payload by a corresponding slot offset value in the first DCI payload when combining the first DCI payload and the second DCI payload.

7. The method of claim 1, wherein repeatedly receiving DCI further comprises:
   repeatedly receiving the DCI from multiple monitoring occasions of the first SS set and the second SS set in one or more slots.

8. The method of claim 1, wherein a repetition number of the DCI is determined by the configuration of the first SS set and the second SS set, the configuration including one or more of: monitoringSlotPeriodicityAndOffset, duration, and monitoringSymbolsWithinSlot.

9. A method of wireless communication performed by a user equipment (UE), comprising:
   receiving a configuration of search space (SS) sets in a control resource set (CORESET) that has at least a first transmission configuration indication (TCI) state and a second TCI state activated;
   receiving a bit map that identifies an association between one or more TCI states and a corresponding SS set in the CORESET;
   repeatedly receiving downlink control information (DCI) via a first physical downlink control channel (PDCCH) and a second PDCCH, wherein the first PDCCH is decoded based on the first TCI state and the second PDCCH is decoded based on the second TCI state, and wherein the first PDCCH and the second PDCCH are allocated with time-and-frequency resources configured for one or more of the SS sets; and
   parsing the DCI to obtain control information for the wireless communication.

10. The method of claim 9, wherein the first PDCCH and the second PDCCH belong to a same SS set associated with two TCI states.

11. The method of claim 9, wherein the first PDCCH and the second PDCCH belong to two SS sets associated with two respective TCI states in the CORESET.

12. The method of claim 9, further comprising:
   receiving a dynamic indication of updating the bit map to change the association between the one or more TCI states and the corresponding SS set.

13. The method of claim 9, further comprising:
   receiving another bit map identifying at least two TCI states associated with a same SS set in the CORESET; and
   receiving a configuration of the same SS set indicating a mapping of the at least two TCI states as one of sequential or cyclic.

14. The method of claim 9, wherein the configuration of the SS sets includes a repetition periodicity to indicate a repetition period in which the DCI is repeatedly received.

15. The method of claim 9, wherein the configuration of the SS sets includes a repetition number of the DCI, and wherein the repetition number is configurable independently from numbers of PDCCH monitoring occasions within a slot and within a monitoring period.

16. The method of claim 9, wherein the configuration indicates, for each of activated TCI states, a group of PDCCH candidates in the CORESET that are associated with the activated TCI state.

17. A method of wireless communication performed by a user equipment (UE), comprising:
   receiving a configuration of search space (SS) sets in a control resource set (CORESET) that has transmission configuration indication (TCI) states activated, wherein the CORESET includes a plurality of resource units in frequency, time, or a combination of frequency and time;
   receiving downlink control information (DCI) using the resource units that are associated with at least two of the TCI states activated in the CORESET;
   repeatedly receiving the DCI via at least two physical downlink control channels (PDCCHs) associated with the at least two of the TCI states; and
   parsing the DCI to obtain control information for the wireless communication.

18. The method of claim 17, wherein each resource unit is one of: a control channel element (CCE), a resource element group (REG), a REG bundle, a resource block (RB), or an orthogonal frequency-division multiplexing (OFDM) symbol.

* * * * *